United States Patent
Park et al.

(10) Patent No.: US 7,780,758 B2
(45) Date of Patent: Aug. 24, 2010

(54) METHOD OF PREPARING METAL NANOCRYSTAL

(75) Inventors: Jin-hwan Park, Yongin-si (KR); Han-su Kim, Yongin-si (KR); Seok-gwang Doo, Yongin-si (KR); Jae-phil Cho, Gumi-si (KR); Hyo-jin Lee, Gumi-si (KR); Yoo-jung Kwon, Gumi-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 711 days.

(21) Appl. No.: 11/652,703

(22) Filed: Jan. 9, 2007

(65) Prior Publication Data

US 2007/0287288 A1  Dec. 13, 2007

(30) Foreign Application Priority Data

May 8, 2006 (KR) .................. 10-2006-0041071

(51) Int. Cl.
*B22F 9/24* (2006.01)
*B82B 3/00* (2006.01)

(52) U.S. Cl. ............... 75/370; 257/E29.071; 977/810; 977/896

(58) Field of Classification Search ........... 75/343–362, 75/370, 371; 257/E29.001–E29.071; 977/773, 977/774, 777, 810, 813, 814, 815, 824, 827, 977/830, 896
See application file for complete search history.

(56) References Cited

U.S. PATENT DOCUMENTS

| 5,482,797 A | 1/1996 | Yamada et al. | |
|---|---|---|---|
| 2003/0121364 A1* | 7/2003 | Sun | 75/362 |
| 2004/0200318 A1* | 10/2004 | Kim et al. | 75/252 |
| 2005/0070106 A1* | 3/2005 | Kauzlarich et al. | 438/689 |
| 2005/0208379 A1 | 9/2005 | Musha et al. | |

FOREIGN PATENT DOCUMENTS

JP  2004-259475  9/2004

OTHER PUBLICATIONS

B.L. Cushing et al. Recent advances in liquid-phase syntheses of inorganic nanoparticles. Chem. Rev. (2004), vol. 104, p. 3893-3946.*
H. Yu. Et al. Heterogeneous Seeded Growth: A Potentially General Synthesis of Monodisperse Metallic Nanoparticles. J. Am. Chem. Soc. (2001), vol. 123, p. 9198-9199.*
SIPO Office action dated Dec. 25, 2009, for Chinese application 200710001436.2. with English translation.
U.S. Office action dated Sep. 14, 2009, for related U.S. Appl. No. 11/736,549, noting U.S. references in this IDS.
Chinese Office action dated Mar. 27, 2009, for Chinese application 200710001436.2, with English translation noting listed Japanese reference in this IDS.
Sun, et al., *Monodisperse FePt Nanoparticles and Ferromagnetic FePt Nanocrystal Superlattices*, www.sciencemag.org Science, vol. 287, Mar. 17, 2000, pp. 1989-1992 and cover.
Patent Abstract of Japan, Publication No. 2004-259475, dated Sep. 16, 2004, in the name of Akihiro Mabushi et al.

* cited by examiner

*Primary Examiner*—George Wyszomierski
*Assistant Examiner*—Mark L Shevin
(74) *Attorney, Agent, or Firm*—Christie, Parker & Hale, LLP

(57) ABSTRACT

Methods of preparing capped metal nanocrystals are provided. One method includes reacting a metal nanocrystal precursor with a reducing agent in a solution having a platinum catalyst.

11 Claims, No Drawings

METHOD OF PREPARING METAL NANOCRYSTAL

CROSS-REFERENCE TO RELATED PATENT APPLICATION

This application claims priority to and the benefit of Korean Patent Application No. 10-2006-0041071, filed on May 8, 2006 in the Korean Intellectual Property Office, the entire content of which is incorporated herein by reference.

BACKGROUND OF THE INVENTION

1. Field of the Invention

The present invention relates to methods of preparing metal nanocrystals.

2. Description of the Related Art

Metal nanocrystals, which are also known as quantum dots, have radii of several nanometers, which are smaller than the Bohr exciton radii. Quantum dots have lots of electrons, but the number of free electrons in the quantum dots is limited to the range of 1 to 100.

Since the electrons of the quantum dots have discrete energy levels, the quantum dots have intrinsic electric and optical properties which are different from bulk metals, which have continuous bands of energy levels.

For example, in a conventional semiconductor process, various conductors and insulators are combined to obtain a semiconductor having a certain band gap. However, the energy level of a semiconductor quantum dot varies according to the size of the quantum dot, and thus the band gap can be controlled by simply changing the size of the quantum dot. In addition, a so-called "Coulomb Blockade" can occur. A "Coulomb Blockade" occurs when an electron in a quantum dot blocks a new electron trying to enter the quantum dot. These "Coulomb Blockades" are triggered when the energy required to add electrons is not uniform and changes in stages in the quantum dot. This is different from adding an electron in a bulk phase semiconductor.

Thus, metal nanocrystals having these properties can be used in magneto-optic, thermoelectric, and magneto-electric operations. More particularly, metal nanocrystals can be used in various fields such as information storage media, single electron transistors, light emitting devices (LEDs), biomolecule labeling, and solar batteries.

Metal nanocrystals can be prepared using vapor phase methods, liquid phase methods, etc. Examples of vapor phase methods include metal-organic chemical vapor deposition (MOCVD) and molecular beam epitaxy (MBE). When metal nanocrystals are prepared using the vapor phase method, high degree of crystallinity can be achieved, but the density and uniformity of the metal nanocrystals cannot be easily regulated.

On the other hand, the liquid phase method includes growing quantum dot crystal precursor materials into quantum dot crystals in an organic solvent using a wet chemical method. Using this method, the properties of the nanocrystals can be easily controlled by adjusting reaction conditions and the nanocrystals can be easily prepared. However, when metal nanocrystals are prepared using the liquid phase method, yield is low.

SUMMARY OF THE INVENTION

According to one embodiment of the present invention, a method of preparing metal nanocrystals produces high yield.

According to another embodiment of the present invention, a method of preparing capped metal nanocrystals includes reacting a metal nanocrystal precursor with a reducing agent in a solution having a platinum catalyst.

In one embodiment, the platinum catalyst may include $H_2PtCl_6$, $(NH_4)_2PtCl_4$, $(NH_4)_2PtCl_6$, $K_2PtCl_4$, $K_2PtCl_6$, and combinations thereof.

According to another embodiment of the present invention, the metal in the metal nanocrystal precursor may be a metal selected from Group II metals, Group III metals, Group IV metals, alloys thereof and combinations thereof.

In one embodiment, the metal nanocrystal precursor may include Si, Sn, Ge, Al, Pb, alloys thereof and combinations thereof.

According to another embodiment, the metal in the metal nanocrystal precursor may include a metal that does not react with lithium. The metal that does not react with lithium may include Co, Fe, Ni, Cu, Ti and combinations thereof.

In yet another embodiment, the metal nanocrystal precursor may include at least one metal halide.

According to one embodiment, the reducing agent may be an organometallic compound. The organometallic compound may include sodium naphthalenide, potassium naphthalenide, sodium anthracenide, potassium anthracenide and combinations thereof.

In one embodiment, the method of preparing capped metal nanocrystals may further include adding a compound including a functional group that caps the metal nanocrystals to the solution. The functional group may be selected from C2-C10 alkyl groups, C3-C10 arylalkyl groups, C3-C10 alkylaryl groups, and C2-C10 alkoxy groups.

According to one embodiment of the invention, the method of preparing metal nanocrystals produces higher yield than conventional methods by using a platinum catalyst.

DETAILED DESCRIPTION OF THE INVENTION

The present invention will now be described with reference to certain exemplary embodiments of the invention. The invention may, however, be embodied in many different forms and is not limited to the described embodiments. Rather, the described embodiments are provided for illustrative purposes only.

According to one embodiment of the present invention, a method of preparing capped metal nanocrystals includes reacting a metal nanocrystal precursor with a reducing agent in a solution having a platinum catalyst. The platinum catalyst promotes formation of the metal nanocrystals. That is, the yield of metal nanocrystals can be increased by increasing the growth rate of the metal nanocrystals formed from the metal nanocrystal precursor.

Any platinum catalyst used in the art can be used. Nonlimiting examples of suitable platinum catalysts include $H_2PtCl_6$, $(NH_4)_2PtCl_4$, $(NH_4)_2PtCl_6$, $K_2PtCl_4$, and $K_2PtCl_6$.

According to one embodiment, the metal in the metal nanocrystal precursor is selected from Group II metals, Groups III metals, Group IV metals, and alloys thereof. For example, the metal may be selected from Si, Sn, Ge, Al, Pb and alloys thereof.

In another embodiment, the metal in the metal nanocrystal precursor may include a metal that does not react with lithium. For example, the metal may be selected from Co, Fe, Ni, Cu and Ti.

Any precursor material used in the art may be used for the metal nanocrystal precursor. In one embodiment, the metal nanocrystal precursor may be a metal halide. Nonlimiting examples of suitable metal halides include $SiCl_4$, $SnCl_4$, and $GeCl_4$.

According to one embodiment of the present invention, the reducing agent used in the method of preparing capped metal nanocrystals may be an organometallic compound. In one embodiment, the organometallic compound may include sodium naphthalenide, potassium naphthalenide, sodium anthracenide, potassium anthracenide and combinations thereof.

In another embodiment, the method may further include adding a compound including a functional group for capping the metal nanocrystals to the solution. The functional group for capping the metal nanocrystals may be selected from C2-C10 alkyl groups, C3-C10 arylalkyl groups, C3-C10 alkylaryl groups, and C2-C10 alkyoxy groups.

The metal nanocrystals obtained using the methods of the present invention can be used in any field in which properties of the metal nanocrystals are effective.

For example, a metal nanocrystal composite can be prepared by sintering the capped metal nanocrystals under an inert atmosphere. The metal nanocrystal composite may have a first composite particulate including metal nanocrystals having an average particle diameter of about 20 nm or less, and a carbon coating layer formed on a surface of the metal nanocrystals. In addition, a second composite particulate in which a plurality of the first composite particulates are connected to each other by means of the carbon coating layer can be included in the metal nanocrystal composite. In one embodiment, the metal nanocrystal composite can be used as an anode active material for a battery.

The present invention will now be described with reference to the following examples. The examples are provided for illustrative purposes only and are not intended to limit the scope of the present invention.

Preparation of Capped Metal Nanocrystals

Example 1

5.4 g of sodium and 19.38 g of naphthalene were dissolved in 100 ml of ethylene glycol dimethyl ether and stirred overnight to prepare a first solution of sodium naphthalenide. The first solution of sodium naphthalenide was quickly added by cannula to a second solution containing 6.82 g of $SiCl_4$ dissolved in 50 ml of ethylene glycol dimethyl ether while stirring. Then, 3.4 g of $H_2PtCl_6$ was added to prepare a dark brown dispersion. The dispersion was stirred for 30 minutes, and 60 ml of butyllithium was added to the dispersion. As a result, a dark brown solution was immediately obtained. Then, the solvent and naphthalene were removed by placing the solution in a heated water tank and using a rotary evaporator under reduced pressure. The resulting dark brown solid was extracted with hexane and washed three times with distilled water. After removing the solvent, a pale yellow solid was obtained. Thus, 3.38 g of capped metal nanocrystals were obtained. The amount of Si in the capped metal nanocrystals was measured using thermogravimetric analysis (TGA) and compared with the initial amount of Si. The yield of Si was 19.3%.

Example 2

5.4 g of sodium and 19.38 g of naphthalene were dissolved in 100 ml of ethylene glycol dimethyl ether and stirred overnight to prepare a first solution of sodium naphthalenide. The first solution of sodium naphthalenide was quickly added by a cannula to a second solution containing 3.41 g of $SiCl_4$ and 5.26 of $SnCl_4$ dissolved in 50 ml of ethylene glycol dimethyl ether while stirring. Then, 3.4 g of $H_2PtCl_6$ was added to prepare a dark brown dispersion. The dispersion was stirred for 30 minutes, and 60 ml of butyllithium was added to the dispersion. As a result, a dark brown solution was immediately obtained. Then, the solvent and naphthalene were removed by placing the solution in a heated water tank and using a rotary evaporator under reduced pressure. The resulting pale yellow solid was extracted with hexane and washed three times with distilled water. After removing the solvent, a sticky pale yellow solid was obtained. Thus, 6.5 g of capped metal nanocrystals were obtained.

Example 3

5.4 g of sodium and 19.38 g of naphthalene were dissolved in 100 ml of ethylene glycol dimethyl ether and stirred overnight to prepare a first solution of sodium naphthalenide. The first solution of sodium naphthalenide was quickly added by a cannula to a second solution containing 8.6 g of $GeCl_4$ dissolved in 50 ml of ethylene glycol dimethyl ether while stirring. Then, 3.4 g of $H_2PtCl_6$ was added to prepare a dark brown dispersion. The dispersion was stirred for 30 minutes, and 60 ml of butyllithium was added to the dispersion. As a result, a dark brown solution was immediately obtained. Then, the solvent and naphthalene were removed by placing the solution in a heated water tank and using a rotary evaporator under reduced pressure. The resulting pale yellow solid was extracted with hexane and washed three times with slightly acidic distilled water. After removing the solvent, a sticky pale yellow solid was obtained. Thus, 5.5 g of capped metal nanocrystals were obtained.

Comparative Example 1

Metal nanocrystals were prepared as in Example 1, except that $H_2PtCl_6$ was not added to the reaction. The amount of Si in the capped metal nanocrystals was measured using TGA and compared with the initial amount of Si. The yield was 3.5%.

The yields of capped metal nanocrystals obtained in Examples 1 through 3 and Comparative Example 1 are shown in Table 1 below.

TABLE 1

|  | Conditions | Yield (%) |
| --- | --- | --- |
| Example 1 | Catalyst: $H_2PtCl_6$ | 19.3 |
| Example 2 | Catalyst: $H_2PtCl_6$ | 24.6 |
| Example 3 | Catalyst: $H_2PtCl_6$ | 21.2 |
| Comparative Example 1 | No catalyst | 3.5 |

The yields of the metal nanocrystals obtained in Examples 1 through 3 were about 5 times higher than that of Comparative Example 1.

The methods of the present invention enable easy preparation and high yield of metal nanocrystals.

While the present invention has been illustrated and described with reference to certain exemplary embodiments, it is understood by those of ordinary skill in the art that various modifications and changes may be made to the described embodiments without departing from the spirit and scope of the present invention as defined by the following claims.

What is claimed is:

1. A method of preparing capped metal nanocrystals, the method comprising reacting a metal nanocrystal precursor selected from the group consisting of Group II metals, Group III metals, Group IV metals, alloys thereof, and combinations thereof with an organometallic reducing agent in a solution comprising a platinum catalyst selected from the group consisting of $H_2PtCl_6$, $(NH_4)_2PtCl_4$, $(NH_4)_2PtCl_6$, $K_2PtCl_4$, $K_2PtCl_6$, and combinations thereof.

2. The method of claim 1, wherein the metal nanocrystal precursor comprises a metal selected from the group consisting of Si, Sn, Ge, Al, Pb, alloys thereof and combinations thereof.

3. The method of claim 1, wherein the metal nanocrystal precursor comprises at least one metal halide.

4. The method of claim 1, wherein the organometallic compound is selected from the group consisting of sodium naphthalenide, potassium naphthalenide, sodium anthracenide, potassium anthracenide and combinations thereof.

5. The method of claim 1, wherein the solution further comprises a compound comprising a functional group for capping the metal nanocrystals.

6. The method of claim 5, wherein the functional group for capping the metal nanocrystal is selected from the group consisting of C2-C10 alkyl groups, C3-C10 arylalkyl groups, C3-C10 alkylaryl groups, and C2-C10 alkyoxy groups.

7. A method of preparing capped metal nanocrystals, the method comprising reacting a metal nanocrystal precursor of a metal selected from the group consisting of Co, Fe, Ni, Cu, Ti and combinations thereof with an organometallic reducing agent in a solution comprising a platinum catalyst selected from the group consisting of $H_2PtCl_6$, $(NH_4)_2PtCl_4$, $(NH_4)_2PtCl_6$, $K_2PtCl_4$, $K_2PtCl_6$, and combinations thereof.

8. The method of claim 7, wherein the metal nanocrystal precursor comprises at least one metal halide.

9. The method of claim 7, wherein the organometallic compound is selected from the group consisting of sodium naphthalenide, potassium naphthalenide, sodium anthracenide, potassium anthracenide and combinations thereof.

10. The method of claim 7, wherein the solution further comprises a compound comprising a functional group for capping the metal nanocrystals.

11. The method of claim 10, wherein the functional group for capping the metal nanocrystal is selected from the group consisting of C2-C10 alkyl groups, C3-C10 arylalkyl groups, C3-C10 alkylaryl groups, and C2-C10 alkyoxy groups.

* * * * *